United States Patent
Lee et al.

(10) Patent No.: US 11,989,108 B2
(45) Date of Patent: May 21, 2024

(54) MULTI-TIER HEAT MAPS

(71) Applicant: Dell Products L.P., Round Rock, TX (US)

(72) Inventors: Shuyu Lee, Acton, MA (US); Vamsi K. Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 88 days.

(21) Appl. No.: 17/958,657

(22) Filed: Oct. 3, 2022

(65) Prior Publication Data

US 2024/0111649 A1   Apr. 4, 2024

(51) Int. Cl.
*G06F 3/06* (2006.01)
*G06F 11/07* (2006.01)
*G06F 11/30* (2006.01)

(52) U.S. Cl.
CPC .......... *G06F 11/3034* (2013.01); *G06F 3/061* (2013.01); *G06F 3/0653* (2013.01); *G06F 3/067* (2013.01); *G06F 11/076* (2013.01); *G06F 11/3058* (2013.01); *G06F 11/3075* (2013.01)

(58) Field of Classification Search
None
See application file for complete search history.

(56) References Cited

U.S. PATENT DOCUMENTS

| | | | |
|---|---|---|---|
| 10,372,556 B1 | 8/2019 | Baruch | |
| 11,010,082 B2 | 5/2021 | Nanda et al. | |
| 11,243,829 B2 | 2/2022 | Krasner et al. | |
| 11,281,527 B2 | 3/2022 | Xu et al. | |
| 11,386,047 B2 | 7/2022 | Chen et al. | |
| 2017/0139705 A1* | 5/2017 | Grisa | G06F 8/72 |
| 2018/0136838 A1* | 5/2018 | White | G06F 3/0647 |

* cited by examiner

*Primary Examiner* — Brian R Peugh
(74) *Attorney, Agent, or Firm* — BainwoodHuang

(57) ABSTRACT

Techniques for providing multi-tier heat maps in a storage system. The techniques include obtaining a temperature of a storage object using a first heat map of data IO activity at a storage object level of the data, and determining that the temperature of the storage object exceeds a predetermined threshold. The techniques further include, in response to determining that the temperature of the storage object exceeds the predetermined threshold, obtaining at least one temperature of at least one storage element associated with the storage object using a second heat map of data IO activity at a storage element level of the data, and performing a storage operation on the storage object based on the temperature of the storage object and/or the temperature of the storage element. Such use of multi-tier heat maps allow accurate temperature predictions to be made in a manner that conserves and adapts to available system resources.

20 Claims, 5 Drawing Sheets

Heat map at
Volume level

| Heat map 124.1 ||
|---|---|
| Volume 308.1 | 25 |
| Volume 308.2 | 15 |
| Volume 308.3 | 10 |
| Volume 308.4 | 05 |
| ⋮ ||

*Fig. 3c*

Heat map at
Leaf level

| Heat map 124.2 ||
|---|---|
| Leaf page 306.1 | 20 |
| Leaf page 306.2 | 25 |
| Leaf page 306.3 | 25 |
| Leaf page 306.4 | 15 |
| ⋮ ||

*Fig. 3d*

MULTI-TIER HEAT MAPS

BACKGROUND

Storage systems include storage processors and arrays of storage drives ("storage array(s)") such as solid-state storage drives (SSDs) and hard disk storage drives (HDDs). The storage processors service storage input/output (IO) requests issued by storage client computers ("storage client(s)") communicably coupled to the storage systems. The storage IO requests (e.g., read requests, write requests) specify data blocks, data pages, data files, or other data storage elements containing data (or metadata) to be read from or written to volumes, virtual volumes, logical units, filesystems, or other storage objects maintained on the storage drives. The storage processors make decisions regarding data storage tiering, data prefetching, data load balancing, and so on, based on levels of data input/output (IO) activity of the storage objects involved. Such levels of data IO activity (e.g., the number of storage IO operations performed, the number of bytes transferred per given time interval) are referred to as the "temperatures" of the storage objects. Storage objects with high levels of data IO activity are deemed "hot" while those with low levels of data IO activity are deemed "cold." The storage systems employ data structures referred to as "heat maps" to represent generated or predicted temperatures of the storage objects stored on the storage systems.

SUMMARY

A storage system can include a memory that implements a number of logical software layers such as a namespace layer, an object layer, a mapping layer, and a data layer. The mapping layer can include pointer arrays arranged in a hierarchy of a mapping tree (e.g., a B+ tree), which can have multiple levels ranging from a top level to a leaf level. The object layer can consume a large logical address space (e.g., 8 exabytes (EB)) to accommodate a plurality of storage objects (e.g., volumes), each of which can ultimately be divided into a plurality of data pages (or "leaf pages") at the leaf level of the mapping layer. The storage system can use a heat map to represent generated or predicted temperatures of volumes at a volume level of the logical software layers, leaf pages at the leaf level of the mapping layer, or any other suitable storage object or storage element at any other suitable level or layer of the logical software layers.

Such a heat map representation of temperatures of storage objects or storage elements can be problematic, however, due to the wide range of granularity provided from the volume level of the logical software layers to the leaf level of the mapping layer. For example, a storage system may employ a heat map for volumes at the volume level, which may have a granularity of one (1) terabyte (TB). However, such a coarse granularity at the volume level can make it difficult to accurately predict temperatures of the volumes. Alternatively, the storage system may employ a heat map for leaf pages associated with a volume at the leaf level, which may have a granularity of 4 kilobytes (KB). However, such a relatively fine granularity at the leaf level can cause the heat map to consume an inordinate amount of memory storage space. Moreover, generating or predicting temperatures of storage objects/elements at a particular level of the logical software layers can dictate the use of one type of heat map algorithm with a fixed set of features and/or parameters, making it difficult to adapt the heat map algorithm to available storage system resources.

Techniques are disclosed herein for providing and using multi-tier heat maps in a storage system. The disclosed techniques can provide and use multiple heat maps to represent generated or predicted temperatures of storage objects (e.g., volumes) or storage elements (e.g., leaf pages) stored on the storage system. In the disclosed techniques, a first heat map can be used to represent temperatures of volumes at a volume level of logical software layers implemented in a memory of the storage system, and a second heat map can be used to represent temperatures of leaf pages at a leaf level of a mapping layer implemented in the memory of the storage system. Further, a first heat map algorithm based on a more sophisticated prediction technique (e.g., a time-series prediction technique) can be used to generate temperatures of the volumes at the volume level, while a second heat map algorithm based on a less sophisticated prediction technique (e.g., a moving-average prediction technique) can be used to generate temperatures of the leaf pages at the leaf level. The disclosed techniques can include obtaining a temperature of a volume using a first heat map of data IO activity at a volume level of the data, and determining that the temperature of the volume exceeds a predetermined temperature threshold. The disclosed techniques can further include, in response to determining that the temperature of the volume exceeds the predetermined temperature threshold, obtaining at least one temperature of at least one leaf page associated with the volume using a second heat map of data IO activity at a leaf level of the data, and performing at least one data storage operation on the volume based on one or more of the temperature of the volume and the temperature of the leaf page. Such use of multi-tier heat maps in a storage system can allow more accurate storage object temperature predictions to be made in a manner that conserves and adapts to available processing and/or memory resources of the storage system.

In certain embodiments, a method of providing and using multi-tier heat maps in a storage system includes obtaining a temperature of a storage object from among a plurality of storage objects stored on a storage system, in which the temperature of the storage object is obtained using a first heat map of IO activity of data at a storage object level of the data. The method further includes determining that the temperature of the storage object exceeds a predetermined temperature threshold, and in response to determining that the temperature of the storage object exceeds the predetermined temperature threshold, obtaining a plurality of temperatures of a plurality of storage elements associated with the storage object using a second heat map of IO activity of the data at a storage element level of the data. The method further includes performing at least one data storage operation on the storage object based on one or more of the temperature of the storage object and the plurality of temperatures of the plurality of storage elements associated with the storage object.

In certain arrangements, the method includes receiving a plurality of storage IO requests at a plurality of processing cores of the storage system, in which each of the plurality of processing cores receives at least one of the plurality of storage IO requests. The method further includes processing the plurality of storage IO requests by the plurality of processing cores.

In certain arrangements, the method includes, in response to processing the plurality of storage IO requests, performing, by the plurality of processing cores, storage IO operations on at least some of the respective storage objects and the respective storage elements, and logging information pertaining to the storage IO operations by the respective processing cores, in which the plurality of processing cores log at least some of the information to a plurality of separate logs, respectively.

In certain arrangements, the method includes performing the logging of the information once every predetermined number of storage IO operations.

In certain arrangements, the method includes merging the information pertaining to the storage IO operations contained in the plurality of separate logs to a single log.

In certain arrangements, the method includes executing a first algorithm to generate or predict temperatures of the plurality of storage objects using the merged information pertaining to the storage IO operations performed on the respective storage objects, and representing the temperatures of the plurality of storage objects in the first heat map.

In certain arrangements, the method includes executing a second algorithm to generate or predict temperatures of the plurality of storage elements using the merged information pertaining to the storage IO operations performed on the respective storage elements, in which the second algorithm is different from the first algorithm. The method further includes representing the temperatures of the plurality of storage elements associated with the storage element in the second heat map.

In certain arrangements, the method includes executing the second algorithm in response to a total number of storage IO operations performed on one or more of the storage elements exceeding a predetermined storage IO operation threshold.

In certain arrangements, the method includes recording a timestamp corresponding to a most recent storage IO operation performed on the storage object, and based on the recorded timestamp, determining that a time has elapsed since the most recent storage IO operation was performed on the storage object.

In certain arrangements, the method includes, in response to the elapsed time exceeding a predetermined time threshold, discarding the first heat map and the second heat map.

In certain embodiments, a system for providing and using multi-tier heat maps in a storage system includes a memory and processing circuitry configured to execute program instructions out of the memory to obtain a temperature of a storage object from among a plurality of storage objects stored on a storage system, in which the temperature of the storage object is obtained using a first heat map of IO activity of data at a storage object level of the data. The processing circuitry is further configured to execute the program instructions out of the memory to determine that the temperature of the storage object exceeds a predetermined temperature threshold, and in response to determining that the temperature of the storage object exceeds the predetermined temperature threshold, obtain a plurality of temperatures of a plurality of storage elements associated with the storage object using a second heat map of IO activity of the data at a storage element level of the data. The processing circuitry is further configured to execute the program instructions out of the memory to perform at least one data storage operation on the storage object based on one or more of the temperature of the storage object and the plurality of temperatures of the plurality of storage elements associated with the storage object.

In certain arrangements, the processing circuitry is further configured to execute the program instructions out of the memory to receive a plurality of storage IO requests at a plurality of processing cores of the storage system, in which each of the plurality of processing cores receives at least one of the plurality of storage IO requests. The processing circuitry is further configured to execute the program instructions out of the memory to process the plurality of storage IO requests by the plurality of processing cores.

In certain arrangements, the processing circuitry is further configured to execute the program instructions out of the memory, in response to processing the plurality of storage IO requests, to perform, by the plurality of processing cores, storage IO operations on at least some of the respective storage objects and the respective storage elements. The processing circuitry is further configured to execute the program instructions out of the memory to log information pertaining to the storage IO operations by the respective processing cores, in which the plurality of processing cores log at least some of the information to a plurality of separate logs, respectively.

In certain arrangements, the processing circuitry is further configured to execute the program instructions out of the memory to perform logging of the information once every predetermined number of storage IO operations.

In certain arrangements, the processing circuitry is further configured to execute the program instructions out of the memory to merge the information pertaining to the storage IO operations contained in the plurality of separate logs to a single log.

In certain arrangements, the processing circuitry is further configured to execute the program instructions out of the memory to execute a first algorithm to generate or predict temperatures of the plurality of storage objects using the merged information pertaining to the storage IO operations performed on the respective storage objects, and represent the temperatures of the plurality of storage objects in the first heat map.

In certain arrangements, the processing circuitry is further configured to execute the program instructions out of the memory to execute a second algorithm to generate or predict temperatures of the plurality of storage elements using the merged information pertaining to the storage IO operations performed on the respective storage elements, in which the second algorithm is different from the first algorithm. The processing circuitry is further configured to execute the program instructions out of the memory to represent the temperatures of the plurality of storage elements associated with the storage element in the second heat map.

In certain arrangements, the processing circuitry is further configured to execute the program instructions out of the memory to record a timestamp corresponding to a most recent storage IO operation performed on the storage object, and based on the recorded timestamp, determine that a time has elapsed since the most recent storage IO operation was performed on the storage object. The processing circuitry is further configured to execute the program instructions out of the memory, in response to the elapsed time exceeding a predetermined time threshold, to discard the first heat map and the second heat map.

In certain embodiments, a computer program product includes a set of non-transitory, computer-readable media having instructions that, when executed by processing circuitry, cause the processing circuitry to perform a method that includes obtaining a temperature of a storage object from among a plurality of storage objects stored on a storage system, in which the temperature of the storage object is obtained using a first heat map of IO activity of data at a storage object level of the data. The method further includes determining that the temperature of the storage object exceeds a predetermined temperature threshold, and in response to determining that the temperature of the storage object exceeds the predetermined temperature threshold, obtaining a plurality of temperatures of a plurality of storage elements associated with the storage object using a second heat map of IO activity of the data at a storage element level of the data. The method further includes performing at least one data storage operation on the storage object based on one or more of the temperature of the storage object and the plurality of temperatures of the plurality of storage elements associated with the storage object.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 3c is a diagram of an exemplary heat map that can be used to represent generated or predicted temperatures of storage objects (e.g., volumes) at a volume level of the logical software layers of FIG. 3a;

FIG. 3d is a diagram of an exemplary heat map that can be used to represent generated or predicted temperatures of storage elements (e.g., leaf pages) at a leaf level of the mapping layer of FIG. 3a.

DETAILED DESCRIPTION

Techniques are disclosed herein for providing and using multi-tier heat maps in a storage system. The disclosed techniques can include obtaining a temperature of a storage object (e.g., a volume) using a first heat map of data IO activity at a volume level of the data, and determining that the temperature of the volume exceeds a predetermined threshold. The disclosed techniques further include, in response to determining that the temperature of the volume exceeds the predetermined threshold, obtaining at least one temperature of at least one storage element (e.g., a leaf page) associated with the volume using a second heat map of data IO activity at a leaf level of the data, and performing at least one data storage operation on the volume based on one or more of the temperature of the volume and the temperature of the leaf page. Such use of multi-tier heat maps in a storage system can allow more accurate storage object temperature predictions to be made in a manner that conserves and adapts to available processing and/or memory resources of the storage system.

Figure 1:
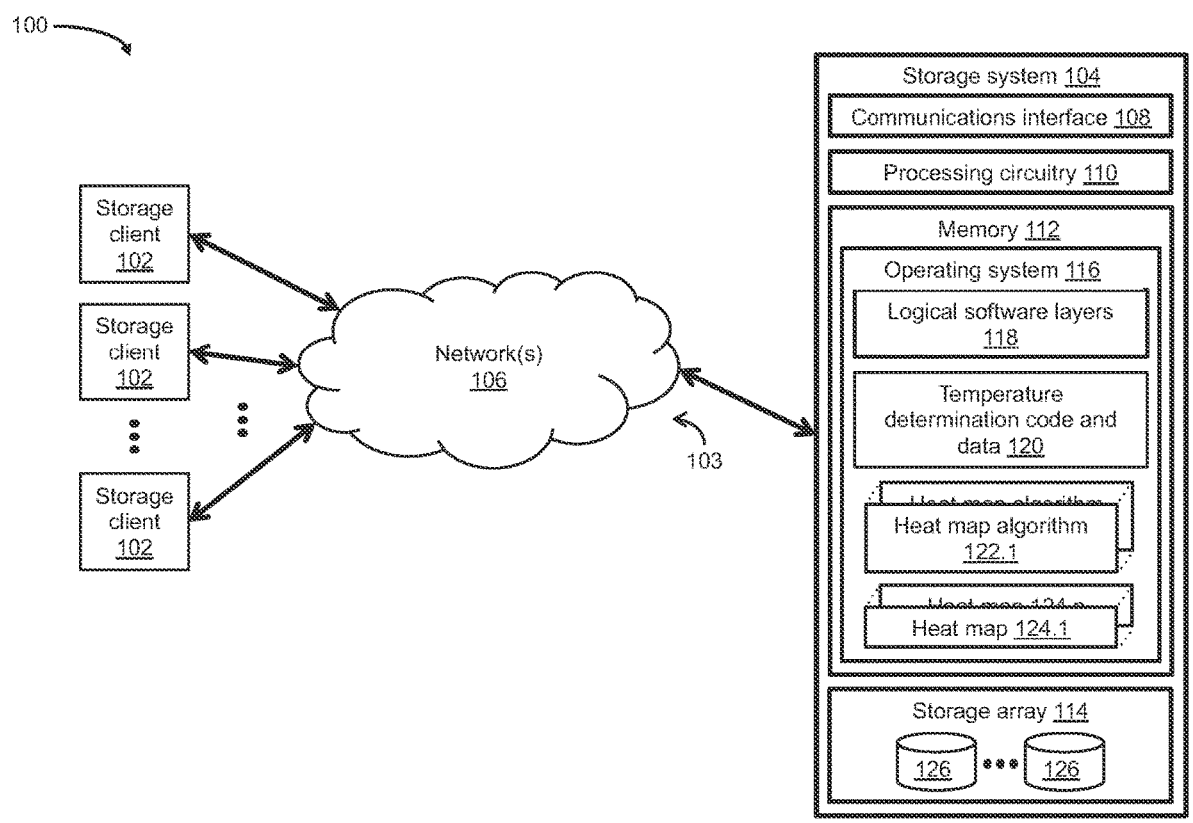
FIG. 1 is a block diagram of an exemplary storage environment, in which techniques can be practiced for providing and using multi-tier heat maps in a storage system.

FIG. 1 depicts an illustrative embodiment of an exemplary storage environment 100, in which techniques can be practiced for providing and using multi-tier heat maps in a storage system. As shown in FIG. 1, the storage environment 100 can include a plurality of storage client computers ("storage client(s)") 102 communicably coupled to a storage system 104 by a communications medium 103 that includes at least one network 106. For example, each of the plurality of storage clients 102 can be configured as an email server computer, a file server computer, a web server computer, or any other suitable client computer, server computer, or computerized device. The storage clients 102 can be further configured to issue, over the network(s) 106, storage input/output (IO) requests (e.g., small computer system interface (SCSI) commands, network file system (NFS) commands) to the storage system 104. Such storage IO requests (e.g., read requests, write requests) can direct the storage system 104 to read and/or write data blocks, data pages, data files, or any other suitable data storage elements from/to storage objects such as volumes (VOLs), virtual volumes (VVOLs), logical units (LUs), filesystems, or any other suitable storage objects maintained on one or more storage drives 126 of a storage array 114. The storage system 104 can be configured as a standalone storage system including a single storage appliance, a clustered storage system including two or more storage appliances, a cloud-based storage system, or any other suitable storage system.

The communications medium 103 can be configured to interconnect the storage clients 102 with the storage system 104 to enable them to communicate and exchange data and control signaling. As shown in FIG. 1, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, and so on, or any suitable combination thereof.

As shown in FIG. 1, the storage system 104 can include a communications interface 108, processing circuitry 110, a memory 112, and the storage array 114. The communications interface 108 can include an Ethernet interface, an InfiniBand interface, a Fiber Channel interface, or any other suitable communications interface. The communications interface 108 can further include SCSI target adapters, network interface adapters, or any other suitable adapters for converting electronic, optical, or wireless signals received over the network(s) 106 to a form suitable for use by the processing circuitry 110. The processing circuitry 110 can be configured to process storage IO requests (e.g., read requests, write requests) issued by the storage clients 102 and store client data in a redundant array of independent disk (RAID) environment implemented on the storage array 114. The storage array 114 can include the storage drives 126 such as solid-state storage drives (SSDs), hard disk storage drives (HDDs), flash storage drives, hybrid storage drives, or any other suitable storage drives. The storage drives 126 can be configured to store VOLs, VVOLs, LUs, filesystems, or any other suitable storage objects for hosting data storage of client applications (e.g., email client applications, file client applications, web client applications) running on the storage clients 102.

Figure 2:
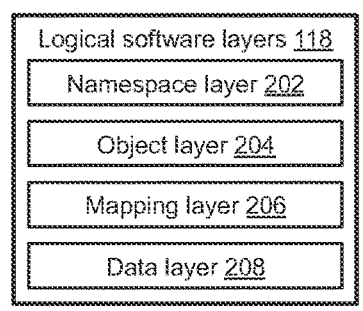
FIG. 2 is a diagram of exemplary logical software layers that can be implemented in a memory of the storage system of FIG. 1.

The memory 112 can include persistent memory (e.g., flash memory, magnetic memory), non-persistent cache memory (e.g., dynamic random-access memory (DRAM), static random-access memory (SRAM)), and an operating system (OS) 116 such as a Linux operating system (OS), Unix OS, Windows OS, or any other suitable operating system. The memory 112 can be configured to implement a number of logical software layers 118 for processing the storage IO requests (e.g., read requests, write requests) issued by the storage clients 102 and storing client data on the storage array 114. As shown in FIG. 2, the logical software layers 118 can include a namespace layer 202, an object layer 204, a mapping layer 206, and a data layer 208. The memory 112 can be further configured to store a variety of software constructs realized in the form of specialized code, data, and/or algorithms such as temperature determination code and data 120 and heat map algorithms 122.1-122.n, as well as store a plurality of data structures such as heat maps 124.1-124.n. Such specialized code, data, and/or algorithms can be executed by the processing circuitry 110 to carry out the techniques and/or methods described herein.

In the context of the processing circuitry 110 being configured to execute specialized code, data, and/or algorithms (e.g., program instructions) out of the memory 112, a computer program product can be configured to deliver all or a portion of the program instructions and data stored and/or maintained in the memory 112 to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and data for performing, when executed by the processing circuitry 110, the various techniques and/or methods described herein.

During operation, the disclosed techniques can provide and use multiple ones of the heat maps 124.1-124.n to represent generated or predicted temperatures of storage objects (e.g., volumes) or storage elements (e.g., leaf pages) maintained on the storage array 114. In the disclosed techniques, a first heat map (e.g., the heat map 124.1; see FIG. 3c) can be used to represent generated or predicted temperatures of volumes in the object layer 204, and a second heat map (e.g., a heat map 124.2; see FIG. 3d) can be used to represent generated or predicted temperatures of leaf pages at a leaf level of the mapping layer 206. Further, a first heat map algorithm (e.g., the heat map algorithm 122.1; see FIG. 1) based on a more sophisticated prediction technique (e.g., a time-series prediction technique) can be used to generate or predict temperatures of volumes in the object layer 204, while a second heat map algorithm (e.g., a heat map algorithm 122.2 from among the heat map algorithms 122.1-122.n; see FIG. 1) based on a less sophisticated prediction technique (e.g., a moving-average prediction technique) can be used to generate temperatures of leaf pages at the leaf level of the mapping layer 206. The disclosed techniques can include obtaining a temperature of a volume using the heat map 124.1 and determining that the temperature of the volume exceeds a predetermined threshold. The disclosed techniques can further include, in response to determining that the temperature of the volume exceeds the predetermined threshold, obtaining at least one temperature of at least one leaf page associated with the volume using the heat map 124.2, and performing at least one data storage operation on the volume based on the temperature of the volume and/or the temperature of the leaf page. Such use of multi-tier heat maps in the storage system 104 can allow more accurate storage object temperature predictions to be made in a manner that conserves and adapts to available processing and/or memory resources of the storage system 104.

The disclosed techniques for providing and using multi-tier heat maps in a storage system will be further understood with reference to the following illustrative example and FIGS. 3a-3d. In this example, the memory 112 of the storage system 104 implements the logical software layers 118, which includes the namespace layer 202, the object layer 204, the mapping layer 206, and the data layer 208.

Figure 3A:
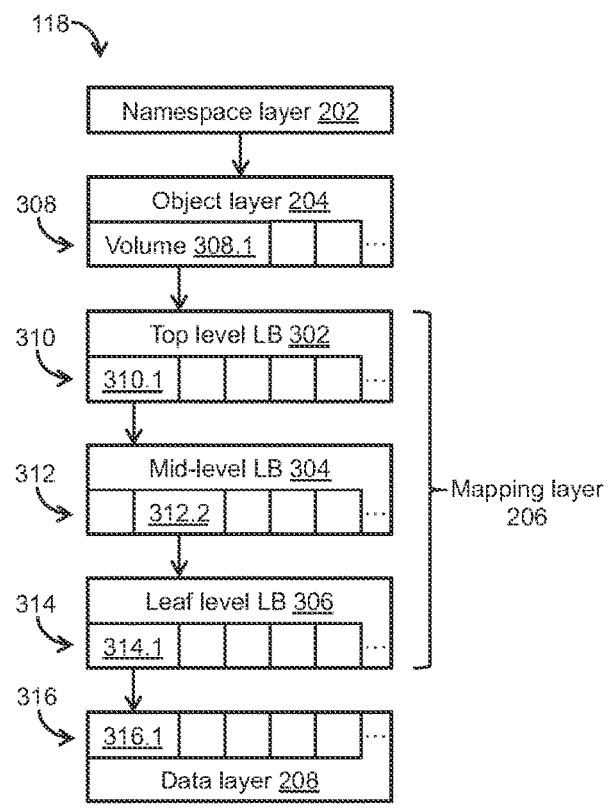
FIG. 3a is a block diagram of the logical software layers of FIG. 2, including a namespace layer, an object layer, a mapping layer, and a data layer.

FIG. 3a depicts a detailed view of the logical software layers 118, including the namespace layer 202, the object layer 204, the mapping layer 206, and the data layer 208. The namespace layer 202 can be configured to organize and track logical addresses of storage objects such as volumes 308. The object layer 204 can be configured to maintain a logical view of the volumes 308 and present them to the storage clients 102 as objects of storage IO operations (read operations, write operations). The mapping layer 206 can be configured to include a collection of logical blocks (LBs) organized in a tree structure (e.g., a B+ tree) having at least three (3) levels, namely, a top level, a mid-level, and a leaf level. As shown in FIG. 3a, each logical block in the top level (such as a top level LB 302) can be associated with one or more pointers (such as one or more pointers 310). Likewise, each logical block in the mid-level (such as a mid-level LB 304) can be associated with one or more pointers (such as one or more pointers 312) and each logical block in the leaf level (such as a leaf level LB 306) can be associated with one or more pointers (such as one or more pointers 314). In this logical software layer configuration, one or more of the pointers 310 associated with the top level LB 302 (such as a pointer 310.1) can point to one or more logical blocks in the mid-level (such as the mid-level LB 304), one or more of the pointers 312 associated with the mid-level LB 304 (such as a pointer 312.2) can point to one or more logical blocks in the leaf level (such as the leaf level LB 306), and one or more of the pointers 314 associated with the leaf level LB 306 (such as a pointer 314.1) can point to one or more data blocks 316 in the data layer 208 (such as a data block 316.1). In this way, the mapping layer 206 can map logical addresses of the volumes 308 in the object layer 204 (such as a volume 308.1) to one or more of the data blocks 316 in the data layer 208.

In this example, it is assumed that the object layer 204 corresponds to a volume level of the logical software layers 118 and consumes a large logical address space (e.g., 8 exabytes (EB)) to accommodate the volumes 308. For example, the number of volumes 308 at the volume level may be on the order of thousands (1,000s). It is further assumed that each of the volumes 308 is ultimately divided into a plurality of data pages (or "leaf pages") at the leaf level of the mapping layer 206, in which each leaf level LB corresponds to at least one leaf page. For example, the number of leaf pages at the leaf level may be on the order of millions (1,000,000s). The storage system 104 uses two or more of the heat maps 124.1-124.n (e.g., the heat map 124.1, the heat map 124.2; see FIGS. 3b and 3c) to represent generated or predicted temperatures of each of the volumes 308 at the volume level of the logical software layers 118, as well as temperatures of leaf pages associated with the volume at the leaf level of the mapping layer 206. It is noted that the storage system 104 can alternatively (or in addition) use such heat maps to represent generated or predicted temperatures at any other suitable layer or level of the logical software layers 118.

Figure 3B:
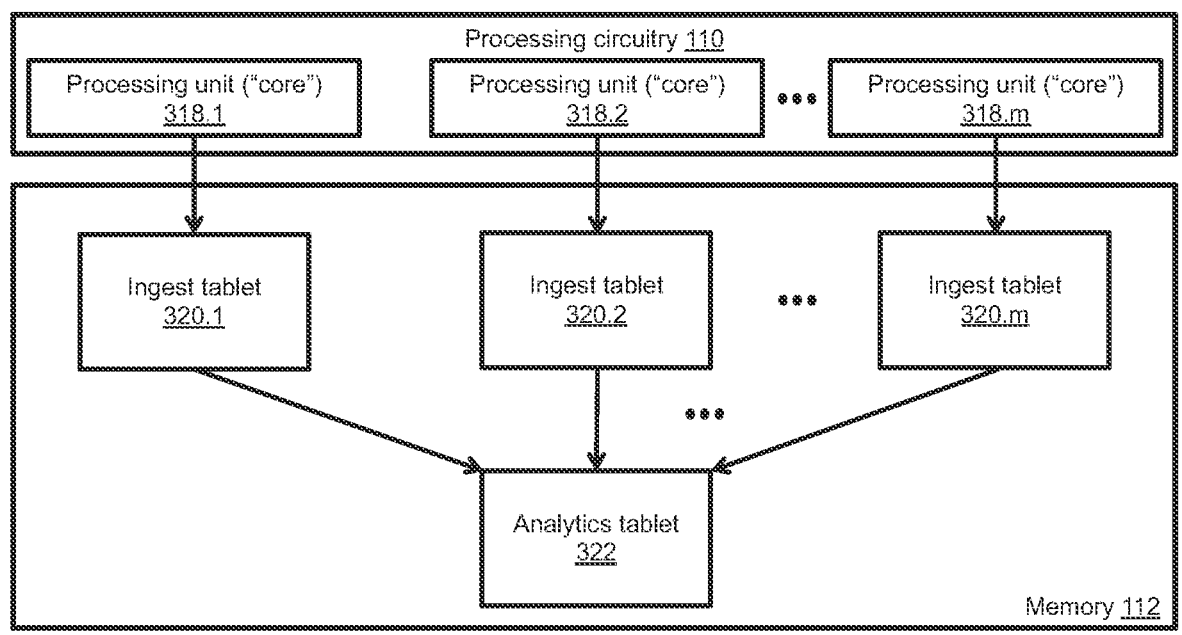
FIG. 3b is a block diagram of exemplary memory and processing circuitry that can be included in the storage system of FIG. 1.

FIG. 3b depicts a detailed view of the processing circuitry 110 and the memory 112 of the storage system 104, each of which is configured to perform techniques of this illustrative example. As shown in FIG. 3b, the processing circuitry 110 includes a plurality of processing circuitries or units (or "cores") 318.1, 318.2, . . . , 318.m. As described herein, storage IO requests (e.g., read requests, write requests) issued by the storage clients 102 can direct the storage system 104 to perform read/write operations to read/write data blocks, data pages, data files, or any other suitable data storage elements from/to storage objects such as VOLs, VVOLs, LUs, filesystems, or any other suitable storage objects. In this example, such read/write requests can be simultaneously (e.g., in parallel) processed and logged by the respective cores 318.1, . . . , 318.m of the processing circuitry 110. To avoid log contention among the plurality of cores 318.1, . . . , 318.m, the memory 112 maintains a separate log (or "ingest tablet") for each of the cores 318.1, . . . , 318.m. As shown in FIG. 3b, the memory 112 maintains an ingest tablet 320.1 for the core 318.1, an ingest tablet 320.2 for the core 318.2, and so on, up to an ingest tablet 320.m for the core 318.m. Accordingly, as read/write requests arrive at the plurality of cores 318.1, 318.2, . . . , 318.m, they can be processed and suitably logged to the appropriate ingest tablets 320.1, 320.2, . . . , 320.m, respectively.

For example, each of the ingest tablets 320.1, . . . , 320.m may maintain a log of information pertaining to each storage object (e.g., volume) and/or storage element (e.g., leaf page) specified in one or more of the read/write requests, including, but not limited to:

the number of read operations performed on the storage object/element;
  the number of write operations performed on the storage object/element;
  the size of read operations performed on the storage object/element;
  the size of write operations performed on the storage object/element;
  the time (e.g., timestamp) that a read/write operation was performed on the storage object/element;
  the logical block address (LBA) of a read/write operation performed on the storage object/element; and/or
  an identifier of the storage object/element.

It is noted that such information pertaining to a storage object or storage element can be captured and logged over a given time interval such as five (5) minutes or any other suitable time interval. In certain embodiments, such information can be captured and logged for one (1) IO trace per "N" numbers of read/write operations performed on a storage object (e.g., volume), in which "N" is configurable based on an IO load of the storage system 104, prediction accuracy, and/or memory consumption. For example, if N=1, then such information may be captured and logged for every IO trace. Further, if N>1, then the capturing and logging of such information for N−1 IO traces may be skipped for increased efficiency.

Because read/write requests directed to storage locations of a particular volume may be processed and logged by different ones of the cores 318.1, . . . , 318.m, once at least one of the ingest tablets 320.1, . . . , 320.m is deemed "full," log entries in the ingest tablets 320.1, . . . , 320.m are sorted and merged to an analytics tablet 322 maintained in the memory 112. Further, once the log entries have been sorted and merged, the resulting information in the analytics tablet 322 is used to generate or predict temperatures of the volumes 308 at a coarse granularity of the volume level.

As described herein, in this example, the number of volumes 308 at the volume level is on the order of thousands (1,000 s). Due to the relatively limited number of volumes 308 at the volume level, the temperature of each of the volumes 308 (e.g., the volume 308.1; see FIG. 3a) can be generated or predicted using a heat map algorithm (e.g., the heat map algorithm 122.1; see FIG. 1) based on a more sophisticated prediction technique such as a time-series prediction technique that uses machine learning (ML). For example, the heat map algorithm 122.1 may include a supervised regression model or any other suitable ML model. To that end, the processing circuitry 110 executes the temperature determination code and data 120 to generate or predict a plurality of features relevant to the temperature of each of the volumes 308 using the information in the analytics tablet 322, provides the plurality of generated features as input to the heat map algorithm 122.1 based on the time-series prediction technique, and executes the heat map algorithm 122.1 at given time intervals (e.g., 5-minute intervals) to generate or predict the temperatures of the volumes 308 at the volume level. For example, for each storage object (or storage element) of interest, the plurality of features may include, but are not limited to: the total number of read operations performed on the storage object/element;

the total number of write operations performed on the storage object/element;
  the total number of read/write operations performed on the storage object/element;
  the percentage (%) of read/write operations performed on the storage object/element that are read operations;
  the percentage (%) of read/write operations performed on the storage object/element that are write operations;
  the average size of read operations performed on the storage object/element;
  the average size of write operations performed on the storage object/element;
  the standard deviation of sizes of read operations performed on the storage object/element;
  the standard deviation of sizes of write operations performed on the storage object/element;
  the percentage (%) of consecutive pairs of read/write operations performed on the storage object/element that include two (2) read operations;
  the percentage (%) of consecutive pairs of read/write operations performed on the storage object/element that include two (2) write operations;
  the percentage (%) of consecutive pairs of read/write operations performed on the storage object/element that include a read operation followed by a write operation;
  the percentage (%) of consecutive pairs of read/write operations performed on the storage object/element that include a write operation followed by a read operation; and/or
  the total bandwidth (B/W) associated with the storage object/element.

It is noted that, in this example, the amount of storage space required in the memory 112 for implementing the time-series prediction technique is limited or reduced. For example, for data points in a time series (including, e.g., 10 training data points, 1 test data point), a total of 50 features relevant to the temperature of a volume (e.g., the volume 308.1; see FIG. 3a) may be generated. As such, the amount of memory storage space required for the data points in the time series may be obtained, as follows:

$$(50 \text{ features})*(10+1 \text{ data points})*(8 \text{ bytes/feature})=4,400 \text{ bytes.} \quad (1)$$

Further, assuming a memory storage requirement of 5 kilobytes (KB) per volume inode, the amount of memory storage space required for the limited number of volumes 308 (e.g., on the order of thousands (1,000s)) may be on the order of 50 megabytes (MB). It is further noted that the limited number of volumes 308 also limits or reduces the amount of storage system processing resources required to perform the more sophisticated prediction technique (e.g., the time-series prediction technique) at the volume level.

Once the temperatures of the volumes 308 at the volume level have been generated or predicted, the processing circuitry 110 executes the temperature determination code and data 120 to generate a heat map (e.g., the heat map 124.1; see FIG. 3c) that represents the generated or predicted volume temperatures. FIG. 3c depicts the heat map 124.1, which, in this example, represents the generated or predicted temperatures of the volumes 308 at the volume level, namely, the volume 308.1, a volume 308.2, a volume 308.3, a volume 308.4, and so on. As shown in FIG. 3c, a value of "25" in the heat map 124.1 represents a level of data IO activity (or temperature) for the volume 308.1, a value of "15" in the heat map 124.1 represents a level of data IO activity (or temperature) for the volume 308.2, a value of "10" in the heat map 124.1 represents a level of data IO activity (or temperature) for the volume 308.3, a value of "05" in the heat map 124.1 represents a level of data IO activity (or temperature) for the volume 308.4, and so on. Based on the values in the heat map 124.1 representing the temperatures of the volumes 308 at the volume level, a determination is made at the given time intervals (e.g., 5-minute intervals) as to whether any of the values exceed a predetermined threshold value such as "20" or any other suitable threshold value. As shown in FIG. 3c, the value, 25, representing the temperature of the volume 308.1 exceeds the predetermined threshold value of 20. As such, the volume 308.1 can be deemed "hot," while the volumes 308.2, 308.3, 308.4, and so on, having temperatures less than the predetermined threshold value of 20, namely, 15, 10, and 05, respectively, can be deemed "cold." It is noted that the heat map 124.1 can be maintained in the memory 112 of the storage system 104, as well as persisted and updated in the volume inodes for use in making long-term temperature predictions.

Having determined that the value (e.g., 25) representing the temperature of the volume 308.1 exceeds the predetermined threshold value (e.g., 20), the processing circuitry 110 executes a heat map algorithm to generate or predict temperatures of leaf pages associated with the volume 308.1 at a relatively fine granularity of the leaf level, while avoiding executing any heat map algorithm(s) to generate or predict temperatures of leaf pages associated with the volumes 308.2, 308.3, 308.4, and so on, deemed "cold." As described herein, in this example, the number of leaf pages at the leaf level may be on the order of millions (1,000,000 s). Due to the relatively high number of leaf pages at the leaf level, the temperature of each of the leaf pages can be generated or predicted using a heat map algorithm (e.g., the heat map algorithm 122.2 from among the heat map algorithms 122.1-122.n; see FIG. 1) based on a less sophisticated prediction technique such as a moving-average prediction technique (e.g., simple moving-average (SMA) prediction technique, exponential moving-average (EMA) prediction technique). For example, the heat map algorithm 122.2 may include a moving-average regression model or any other suitable model. To that end, the processing circuitry 110 executes the temperature determination code and data 120 to generate a plurality of features relevant to the temperature of each of the leaf pages associated with the volume 308.1 using the information in the analytics tablet 322, provides the plurality of generated features as input to the heat map algorithm 122.2 based on the moving-average prediction technique, and executes the heat map algorithm 122.2 to generate or predict the temperatures of the leaf pages at the leaf level. For example, the plurality of features relevant to the temperature of the leaf pages may include at least a subset of the plurality of features described hereinabove (or any other suitable plurality of features) for each storage object/element of interest such as:

the total number of read operations performed on the storage object/element;
the total number of write operations performed on the storage object/element;
the total number of read/write operations performed on the storage object/element;
the percentage (%) of read/write operations performed on the storage object/element that are read operations;
the percentage (%) of read/write operations performed on the storage object/element that are write operations;
the average size of read operations performed on the storage object/element;
the average size of write operations performed on the storage object/element;
the standard deviation of sizes of read operations performed on the storage object/element;
the standard deviation of sizes of write operations performed on the storage object/element; and/or
the total bandwidth (B/W) associated with the storage object/element.

It is noted that the amount of storage space required in the memory 112 for implementing the moving-average prediction technique is limited or reduced. For example, for each leaf page at the leaf level, a total of ten (10) features relevant to the temperature of the leaf page (e.g., the leaf page 306.1, 306.2, 306.3, 306.4, . . . ; see FIG. 3d) may be generated. Further, assuming one (1) value per generated feature, the amount of memory storage space required for each leaf page may be obtained, as follows:

$$(10 \text{ features})*(1 \text{ value})*(8 \text{ bytes/feature})=80 \text{ bytes.} \quad (2)$$

It is further noted that using a less sophisticated prediction technique such as the moving-average prediction technique at the leaf level not only limits or reduces the required amount of storage system memory resources, but also limits or reduces the required amount of storage system processing resources, thereby allowing temperatures to be generated or predicted for an increased number of leaf pages (e.g., on the order of millions (1,000,000 s)). To further limit or reduce the amount of memory storage space required to implement the moving-average prediction technique, for a leaf page associated with a particular logical address, the temperature of the leaf page can be generated or predicted in response to the total number of read/write operations performed on the leaf page exceeding a predetermined threshold.

Once the temperatures of the leaf pages at the leaf level have been generated or predicted, the processing circuitry 110 executes the temperature determination code and data 120 to generate a heat map (e.g., the heat map 124.2; see FIG. 3d) that represents the generated or predicted leaf page temperatures. FIG. 3d depicts the heat map 124.2, which, in this example, represents the generated or predicted temperatures of the leaf pages at the leaf level, namely, a leaf page 306.1, a leaf page 306.2, a leaf page 306.3, a leaf page 306.4, and so on. As shown in FIG. 3d, a value of "20" in the heat map 124.2 represents a level of data IO activity (or temperature) for the leaf page 306.1, a value of "25" in the heat map 124.2 represents a level of data IO activity (or temperature) for the leaf page 306.2, a value of "25" in the heat map 124.2 represents a level of data IO activity (or temperature) for the leaf page 306.3, a value of "15" in the heat map 124.2 represents a level of data IO activity (or temperature) for the leaf page 306.4, and so on. It is noted that the heat map 124.2 can be maintained in the memory 112 of the storage system 104 for as long as the volume 308.1 is deemed "hot," as well as persisted and updated in the leaf IDPs (indirect data pages) for use in making long-term temperature predictions.

Having generated the heat map 124.2 for temperatures of the leaf pages 306.1, 306.2, 306.3, 306.4, and so on, associated with the volume 308.1 deemed "hot," the heat map 124.2 can be used in conjunction with the heat map 124.1 to predict a temperature of the volume 308.1 with increased accuracy. Further, based on predicted temperatures of the volume 308.1 at the volume level and/or the leaf pages 306.1, 306.2, 306.3, 306.4, and so on, at the leaf level, one or more data storage operations involving the volume 308.1 can be performed such as a data storage tiering operation, a data prefetching operation, a data load balancing operation, or any other suitable data storage operation.

Figure 4:
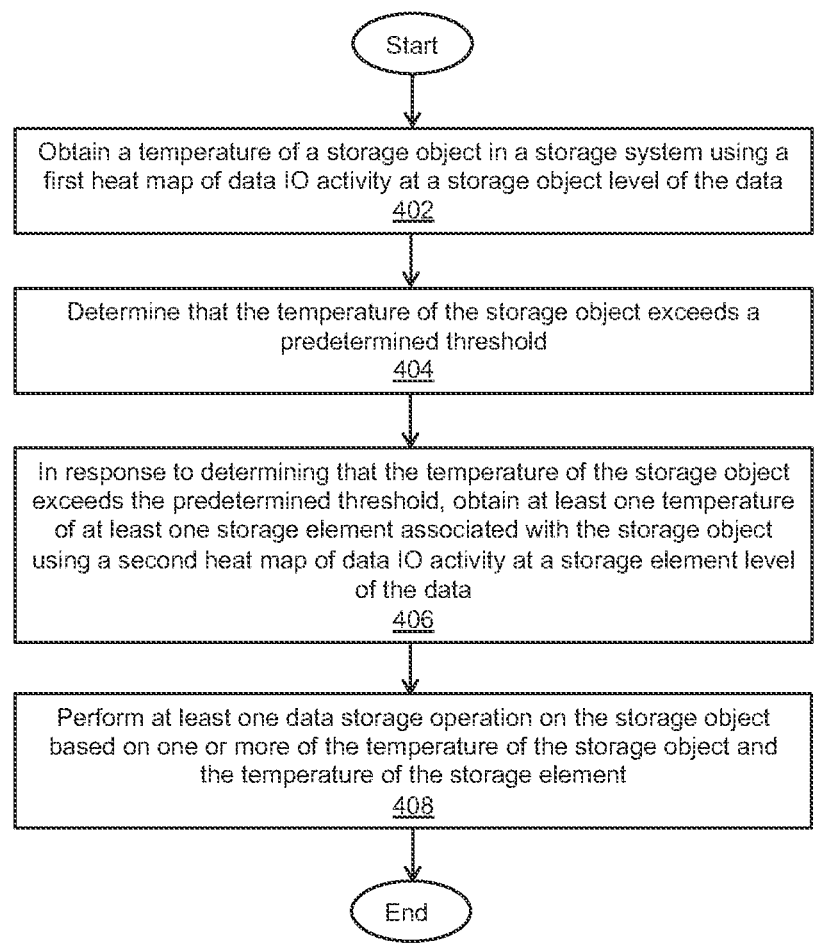
FIG. 4 is a flow diagram of an exemplary method of providing and using multi-tier heat maps in a storage system.

An exemplary method of providing and using multi-tier heat maps in a storage system is described below with reference to FIG. 4. As depicted in block 402, a temperature of a storage object in a storage system is obtained using a first heat map of data IO activity at a storage object level of the data. As depicted in block 404, the temperature of the storage object is determined to exceed a predetermined threshold. As depicted in block 406, in response to determining that the temperature of the storage object exceeds the predetermined threshold, at least one temperature of at least one storage element associated with the storage object is obtained using a second heat map of data IO activity at a storage element level of the data. As depicted in block 408, at least one data storage operation is performed on the storage object based on one or more of the temperature of the storage object and the temperature of the storage element.

Having described the above illustrative embodiments, various alternative embodiments and/or variations may be made and/or practiced. For example, it was described herein that the temperature of each of the volumes 308 (see FIG. 3a) may be generated or predicted using a heat map algorithm that includes a supervised regression model or any other suitable ML model. It was further described herein that the temperature of each leaf page associated with one of the volumes 308 deemed "hot" may be generated or predicted using a heat map algorithm that includes a moving-average regression model or any other suitable model. In certain embodiments, data IO activity of a volume or leaf page can be evaluated against previously predicted temperatures of the volume or leaf page, and based on the evaluated data IO activity, adjustments can be made, as necessary, to the appropriate model.

It was further described herein that the heat map 124.1 (see FIG. 3c) for the volumes 308.1, 308.2, 308.3, 308.4, and so on, can be persisted and updated in the volume inodes, and that the heat map 124.2 (see FIG. 3d) for the leaf pages 306.1, 306.2, 306.3, 306.4, and so on, associated with the volume 308.1 deemed "hot" can be persisted and updated in the leaf IDPs (indirect data pages), for use in making long-term temperature predictions. In certain embodiments, the time (e.g., timestamp) corresponding to the most recent read/write operation performed on the volume 308.1 or an associated leaf page can be recorded. Further, at some later time, a determination can be made as to whether a significant time interval has elapsed since the time of the most recent read/write operation. If so, the volume 308.1 can be deemed "cold" and one or more of the heat maps 124.1, 124.2 can be removed from the memory 112 and/or persistent storage.

It was further described herein that the memory 112 can maintain the plurality of ingest tables 320.1-320.m for use in logging information pertaining to read/write operations performed by the plurality of cores 318.1-318.m, respectively. In certain embodiments, to further limit or reduce storage system resource requirements, such logging of information pertaining to read/write operations can be performed on a sampling basis. For example, such logging of information may be performed once every five (5) read/write operations (or any other suitable number of read/write operations) performed on a storage object or storage element, thereby logging information for 20% (or any other suitable percentage (%)) of the read/write operations. As a result, if a total of one thousand (1,000) read/write operations were performed on the storage object/element in a given time interval, then information pertaining to two hundred (200) of the read/write operations may be logged, thereby providing a sufficient amount of information to decide whether the storage object/element may be deemed "hot" or "cold."

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid-state drives (SSDs), flash devices (e.g., NAND flash devices, NOR flash devices), and/or similar devices that may be accessed locally and/or remotely (e.g., via a storage attached network (SAN)). A storage array (storage drive array, storage disk array) may refer to a storage system used for block-based, file-based, or object-based storage. Storage arrays can include, for example, dedicated storage hardware containing HDDs, SSDs, and/or all flash drives. A storage entity may be any one or more of a filesystem, an object storage, a virtualized device, a logical unit (LU), a logical unit number (LUN), a volume (VOL), a virtual volume (VVOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a storage drive, a storage disk, or an array of storage drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a read request or write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature, method, process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of providing and using multi-tier heat maps in a storage system, comprising:
    obtaining a temperature of a storage object from among a plurality of storage objects stored on a storage system, the temperature of the storage object being obtained using a first heat map of input/output (IO) activity of data at a storage object level of the data;
    determining that the temperature of the storage object exceeds a predetermined temperature threshold;
    in response to determining that the temperature of the storage object exceeds the predetermined temperature threshold, obtaining a plurality of temperatures of a plurality of storage elements associated with the storage object using a second heat map of IO activity of the data at a storage element level of the data; and
    performing at least one data storage operation on the storage object based on one or more of the temperature of the storage object and the plurality of temperatures of the plurality of storage elements associated with the storage object.

2. The method of claim 1 further comprising:
    receiving a plurality of storage IO requests at a plurality of processing cores of the storage system, each of the plurality of processing cores receiving at least one of the plurality of storage IO requests; and
    processing the plurality of storage IO requests by the plurality of processing cores.

3. The method of claim 2 further comprising:
    in response to processing the plurality of storage IO requests, performing, by the plurality of processing cores, storage IO operations on at least some of the respective storage objects and the respective storage elements; and
    logging information pertaining to the storage IO operations by the respective processing cores, the plurality of processing cores logging at least some of the information to a plurality of separate logs, respectively.

4. The method of claim 3 wherein logging the information pertaining to the storage IO operations includes performing the logging of the information once every predetermined number of storage IO operations.

5. The method of claim 3 further comprising:
    merging the information pertaining to the storage IO operations contained in the plurality of separate logs to a single log.

6. The method of claim 5 wherein obtaining the temperature of the storage object includes executing a first algorithm to generate or predict temperatures of the plurality of storage objects using the merged information pertaining to the storage IO operations performed on the respective storage objects; and
    wherein the method further comprises representing the temperatures of the plurality of storage objects in the first heat map.

7. The method of claim 6 wherein obtaining the plurality of temperatures of the plurality of storage elements associated with the storage object includes executing a second algorithm to generate or predict temperatures of the plurality of storage elements using the merged information pertaining to the storage IO operations performed on the respective storage elements, the second algorithm being different from the first algorithm; and
    wherein the method further comprises representing the temperatures of the plurality of storage elements associated with the storage element in the second heat map.

8. The method of claim 7 wherein executing the second algorithm to generate or predict the temperatures of the plurality of storage elements includes executing the second algorithm in response to a total number of storage IO operations performed on one or more of the storage elements exceeding a predetermined storage IO operation threshold.

9. The method of claim 1 further comprising:
    recording a timestamp corresponding to a most recent storage IO operation performed on the storage object;
    based on the recorded timestamp, determining that a time has elapsed since the most recent storage IO operation was performed on the storage object; and
    in response to the elapsed time exceeding a predetermined time threshold, discarding the first heat map and the second heat map.

10. A system for providing and using multi-tier heat maps in a storage system, comprising:
    a memory; and
    processing circuitry configured to execute program instructions out of the memory to:
        obtain a temperature of a storage object from among a plurality of storage objects stored on a storage system, the temperature of the storage object being obtained using a first heat map of input/output (IO) activity of data at a storage object level of the data;
        determine that the temperature of the storage object exceeds a predetermined temperature threshold;
        in response to determining that the temperature of the storage object exceeds the predetermined temperature threshold, obtain a plurality of temperatures of a plurality of storage elements associated with the storage object using a second heat map of IO activity of the data at a storage element level of the data; and perform at least one data storage operation on the storage object based on one or more of the temperature of the storage object and the plurality of temperatures of the plurality of storage elements associated with the storage object.

11. The system of claim 10 wherein the processing circuitry is further configured to execute the program instructions out of the memory to:

receive a plurality of storage IO requests at a plurality of processing cores of the storage system, each of the plurality of processing cores receiving at least one of the plurality of storage IO requests; and process the plurality of storage IO requests by the plurality of processing cores.

12. The system of claim 11 wherein the processing circuitry is further configured to execute the program instructions out of the memory to:

in response to processing the plurality of storage IO requests, perform, by the plurality of processing cores, storage IO operations on at least some of the respective storage objects and the respective storage elements; and log information pertaining to the storage IO operations by the respective processing cores, the plurality of processing cores logging at least some of the information to a plurality of separate logs, respectively.

13. The system of claim 12 wherein the processing circuitry is further configured to execute the program instructions out of the memory to perform logging of the information once every predetermined number of storage IO operations.

14. The system of claim 12 wherein the processing circuitry is further configured to execute the program instructions out of the memory to merge the information pertaining to the storage IO operations contained in the plurality of separate logs to a single log.

15. The system of claim 14 wherein the processing circuitry is further configured to execute the program instructions out of the memory to:

execute a first algorithm to generate or predict temperatures of the plurality of storage objects using the merged information pertaining to the storage IO operations performed on the respective storage objects; and represent the temperatures of the plurality of storage objects in the first heat map.

16. The system of claim 15 wherein the processing circuitry is further configured to execute the program instructions out of the memory to:

execute a second algorithm to generate or predict temperatures of the plurality of storage elements using the merged information pertaining to the storage IO operations performed on the respective storage elements, the second algorithm being different from the first algorithm; and represent the temperatures of the plurality of storage elements associated with the storage element in the second heat map.

17. The system of claim 10 wherein the processing circuitry is further configured to execute the program instructions out of the memory to:

record a timestamp corresponding to a most recent storage IO operation performed on the storage object;

based on the recorded timestamp, determine that a time has elapsed since the most recent storage IO operation was performed on the storage object; and in response to the elapsed time exceeding a predetermined time threshold, discard the first heat map and the second heat map.

18. A computer program product including a set of non-transitory, computer-readable media having instructions that, when executed by processing circuitry, cause the processing circuitry to perform a method comprising:

obtaining a temperature of a storage object from among a plurality of storage objects stored on a storage system, the temperature of the storage object being obtained using a first heat map of input/output (IO) activity of data at a storage object level of the data;

determining that the temperature of the storage object exceeds a predetermined temperature threshold;

in response to determining that the temperature of the storage object exceeds the predetermined temperature threshold, obtaining a plurality of temperatures of a plurality of storage elements associated with the storage object using a second heat map of IO activity of the data at a storage element level of the data; and performing at least one data storage operation on the storage object based on one or more of the temperature of the storage object and the plurality of temperatures of the plurality of storage elements associated with the storage object.

19. The computer program product of claim 18 wherein the method further comprises:

recording a timestamp corresponding to a most recent storage IO operation performed on the storage object; and based on the recorded timestamp, determining that a time has elapsed since the most recent storage IO operation was performed on the storage object.

20. The computer program product of claim 19 wherein the method further comprises:

in response to the elapsed time exceeding a predetermined time threshold, discarding the first heat map and the second heat map.

\* \* \* \* \*